United States Patent [19]
Zarem et al.

[11] Patent Number: 5,457,557
[45] Date of Patent: Oct. 10, 1995

[54] LOW COST OPTICAL FIBER RF SIGNAL DISTRIBUTION SYSTEM

[75] Inventors: Harold A. Zarem, Sherman Oaks; Xian L. Yeh, Diamond Bar; Henry A. Blauvelt, San Marino; Israel Ury, Los Angeles, all of Calif.

[73] Assignee: Ortel Corporation, Alhambra, Calif.

[21] Appl. No.: 184,967

[22] Filed: Jan. 21, 1994

[51] Int. Cl.$^6$ .................... H04B 10/20; H04B 10/00
[52] U.S. Cl. .................... 359/121; 359/145; 359/167; 359/173; 359/178; 379/56
[58] Field of Search .................... 359/120–121, 359/145–146, 125, 157, 164, 173, 167, 178; 379/56, 59; 385/53, 39, 77

[56] References Cited

U.S. PATENT DOCUMENTS 5,251,053  10/1993  Heidemann .................... 359/145

FOREIGN PATENT DOCUMENTS

| 0476569 | 3/1992 | European Pat. Off. .................... 359/167 |
| 2586305 | 2/1987 | France . |
| 61-134712 | 6/1986 | Japan . |
| 2184289 | 6/1987 | United Kingdom . |

OTHER PUBLICATIONS

Chu et al., "Fiber Optic Microcellular Radio" IEEE Transactions on Vehicular Technology, vol. 40, No. 3, Aug. 1991, pp. 599–606.

B. Hillerich, "Trade-Off Between Beam Truncation and Defocussing With Taper Lenses on Single-Mode Fibers," *Optics Communications*, vol. 28, No. 3, Oct. 1, 1988.

M. Shibutani et al., "Reflection Induced Degradations in Optical Fiber Feeder for Microcellular Mobile Radio Systems," *IEICE Transactions on Electronics*, vol. E76–C, No. 2, Feb. 1993.

*Primary Examiner*—Leo H. Boudreau
*Assistant Examiner*—Kinfe-Michael Negash
*Attorney, Agent, or Firm*—Christie, Parker & Hale

[57] ABSTRACT

A fiber optic RF signal distribution system has a plurality of antenna stations, each station including an RF antenna. A central RF signal distribution hub receives and transmits signals external to the system. A pair of optical fibers connects each antenna station directly to the distribution hub with the connections being in a star configuration. A connectorized laser module permits direct coupling of a distributed feedback semiconductor laser to the end of each optical fiber without an intervening connector. The module accepts an APC connector with the angled end of its optical fiber in an aperture plane in a connector housing. A distributed feedback laser is mounted in the connector housing with a lens for illuminating the aperture plane and hence, the end of the fiber at an acute angle to the axis of the fiber. Furthermore, the illumination is defocused at the aperture plane for loose optical coupling to the fiber and minimized reflection to the DFB laser.

19 Claims, 5 Drawing Sheets

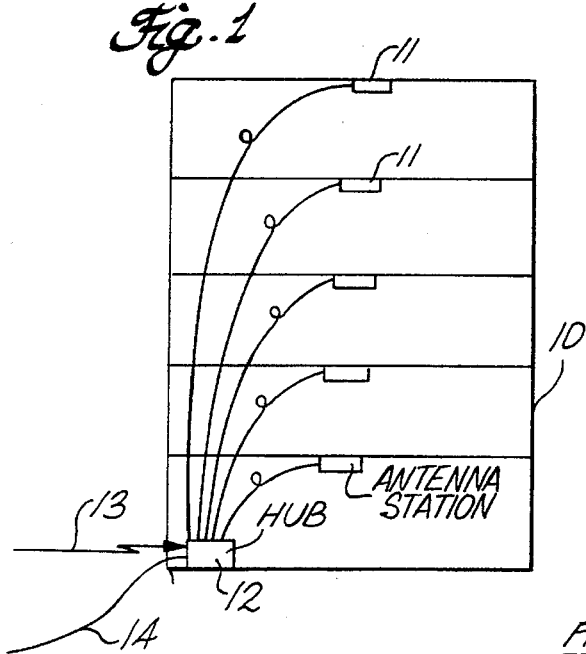
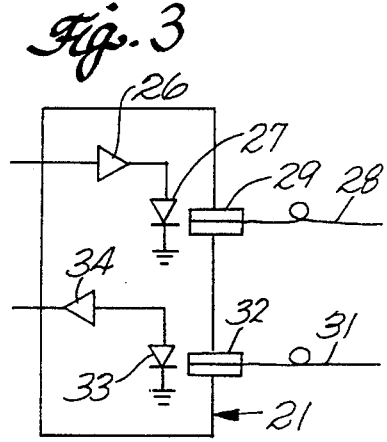
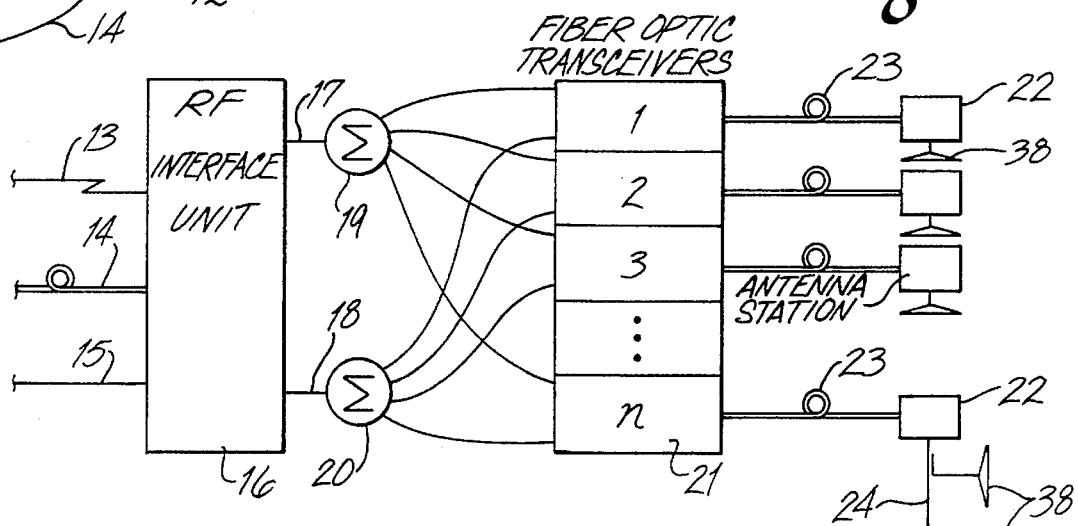
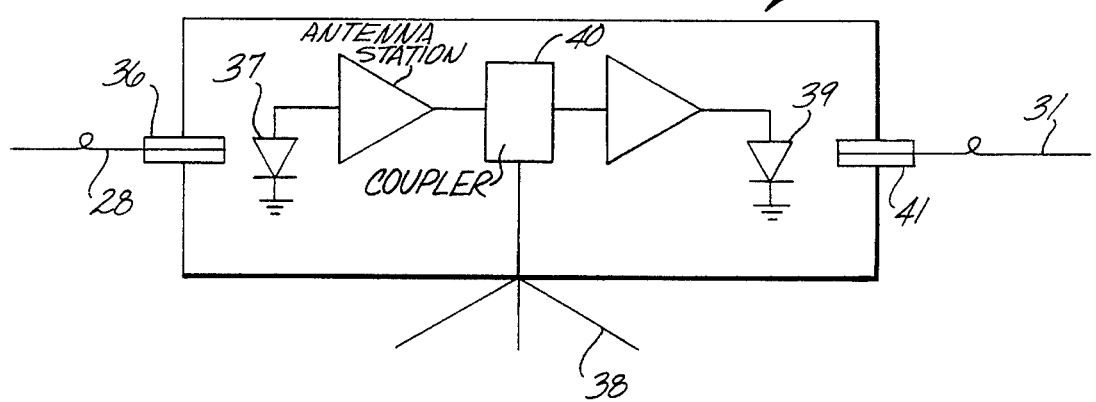

LOW COST OPTICAL FIBER RF SIGNAL DISTRIBUTION SYSTEM

BACKGROUND

This invention concerns a local area wireless network using optical fibers for distributing signals to and from short range antenna stations. A semiconductor laser is mounted in a connector housing for illuminating the angled end of an optical fiber in a connector for minimized reflection interference. A photodiode is also used for receiving signals from an optical fiber. A "connectorized" photodiode is a photodiode mounted in an electrical or optical fiber connector.

Wireless cellular telephone and similar communication systems have proliferated rapidly and are expected to expand dramatically in numbers of users. Furthermore, whereas present cellular telephone systems have a limited capacity sufficient for voice communications and limited handling of data, much broader band systems are expected for handling vast amounts of information for personal and business communications. New systems are needed for this expanding utilization.

It is common practice to increase the overall system capacity by dividing the system into ever smaller cellular units known as microcells. Optical fibers have heretofore been used to interconnect cellular base stations with large microcells, but it has not been considered cost effective to use fiber optics for smaller microcells. Thus, a low cost optical fiber signal distribution system is desirable for use in such microcells or for local area distribution of other RF signals.

In an RF signal distribution system, an individual building or a campus of buildings might, for example, have numerous short range RF antennas scattered within the building or buildings. Communications from outside this microcell or group of microcells are to and from a base station which is connected to an RF signal distribution hub for the building or buildings. Signals are transmitted and received between the hub and the scattered RF antennas for communicating with telephones or data transceivers within the microcell. Such a local network may also serve as a wireless PBX or LAN for communications within the microcell.

There are a number of advantages to such a system. For example, by handling some of the communication paths in a microcell instead of an entire cell of a cellular system, the capacity of the cell can be increased. The bandwidth that can be used for data transmission can be larger when such local area networks are used. Since a telephone or other portable device needs to communicate only over a short range, its power requirements can be decreased, thereby increasing its battery lifetime.

It is important, however, since a large number of antenna stations are needed in such a microcell, that each of the stations have a low cost. This low cost includes not only the components used, but also the ease of assembling a system with a few standardized devices to keep assembly and installation costs low.

It would be desirable to have a low cost reliable optical fiber system for such an RF signal distribution system for a number of reasons. Optical fibers and the lasers and photodetectors used with them are capable of handling very high data rates at low cost. The attenuation by fibers is very low; negligibly low for in-building distances. The RF levels at the antenna stations are therefore nearly independent of their distance from a distribution hub. Fiber is light, flexible and requires relatively little labor to install. Special electrical shielding is not required for preventing radio interference. Such systems can operate with very high reliability and low power consumption. However, no suitable low cost fiber optic systems or components are known.

SUMMARY OF THE INVENTION

There is, therefore, provided in practice of this invention a fiber optic RF signal distribution system for a building, for example, having a plurality of antenna stations distributed through the building, with each antenna station including an RF antenna. A single RF signal distribution hub receives and transmits signals external to the system. A pair of optical fibers connects each antenna station directly to the RF signal distribution hub with the optical fibers being connected in a star configuration.

A typical RF signal distribution system has an RF signal distribution hub for receiving and transmitting signals external to the system or communicating signals within the system. A plurality of electrical to optical converters at the hub convert received electrical signals to outgoing optical signals. Preferably, such an electrical to optical converter comprises an RF modulated distributed feedback semiconductor laser. Similarly, a number of optical to electrical converters at the hub convert incoming optical signals from an optical fiber to electrical signals for transmission outside or back into the system. Conventional photodiodes are suitable optical to electrical converters.

The RF signal distribution hub communicates with a plurality of antenna stations by optical fibers connected in a star configuration. Each of the antenna stations has an RF antenna, a photodetector for sensing outgoing optical signals and means for connecting the photodetector to the antenna for broadcasting an outgoing RF signal. For incoming optical signals, each antenna station comprises a laser and means for connecting the antenna to the laser for converting an incoming RF signal to an incoming optical signal.

The electrical signals may be reconverted to an optical signal for transmission external to the RF signal distribution system. Similarly, the external signals may be originally received as optical signals and converted to electrical signals for processing before being reconverted to an optical signal for distribution in the system.

This invention provides a low cost RF signal distribution system having an electrical to optical connector housing for receiving a connector with an angled end of an optical fiber, such as a standard angled physical contact (APC) connector. An RF modulated distributed feedback semiconductor laser is mounted in the housing with a lens adjacent to the laser for directing light to an aperture plane in the housing. The laser and the lens are offset from the axis of the housing so that light from the laser passes through the aperture plane at an acute angle relative to the axis of the housing. Furthermore, the laser and lens are spaced so that the area of the aperture plane illuminated by the laser is larger than the end of an optical fiber. An APC connector can be mounted in the housing with the angled end of its optical fiber in the aperture plane for illumination by the laser.

DRAWINGS

These and other features and advantages of the invention will be appreciated as the same becomes better understood by reference to the following detailed description when considered in connection with the accompanying drawings wherein:

FIG. 1 illustrates schematically a building having an RF signal distribution hub and fiber optics connected to a number of RF antennas;

FIG. 2 illustrates schematically such a hub connected to antenna stations;

FIG. 3 illustrates schematically an exemplary fiber optic transceiver for use in such a system;

FIG. 4 illustrates schematically a fiber optic antenna station;

DESCRIPTION

Figure 5:
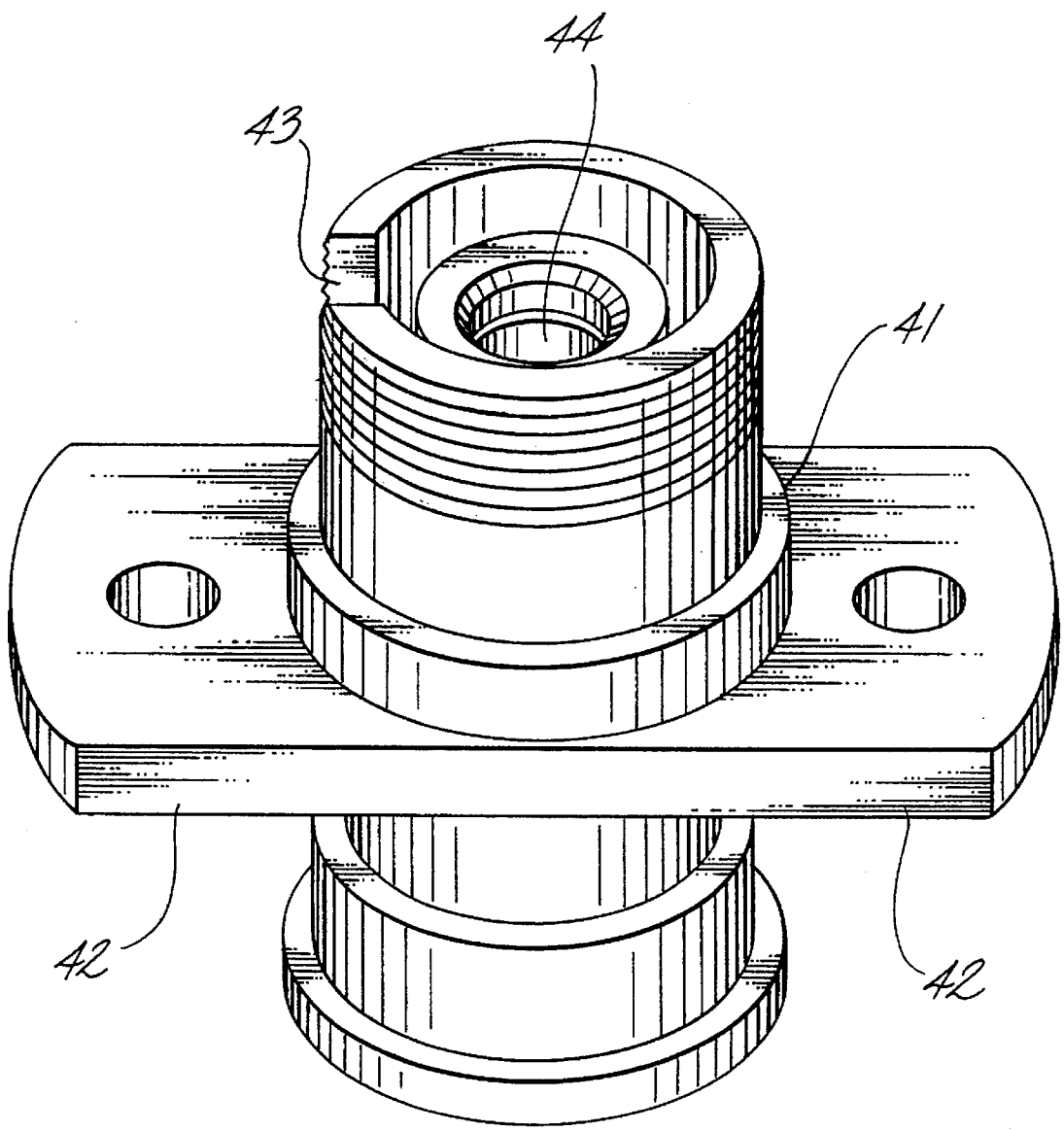
FIG. 5 illustrates in perspective an electrical to optical connector housing.

An RF signal distribution system for a multi-floor building 10 has one or more antenna stations 11 distributed through the building. Each of the antenna stations includes an RF antenna for broadcasting signals to and receiving signals from devices within range of the antenna. Such an antenna station is small and unobtrusive, appearing not much different from the smoke detectors which are ubiquitous in homes, offices and hotels. Antenna stations may be located above drop ceilings in business buildings and not be seen at all. Several such antenna stations may be placed on ceilings or walls on each floor of such a building. Alternatively, such short range antenna stations may be located in several adjacent buildings. The building has one or more RF signal distribution hubs 12 for communicating inside or outside the building.

For purposes of this description a convention has been adopted. A "received signal" means a signal received from outside the system. A "transmitted signal" is a signal transmitted to outside the system. An "outgoing signal" refers to a signal transmitted from the RF signal distribution hub to an antenna station or user. An "incoming signal" is a signal transmitted from an antenna to the RF signal distribution hub. The same convention is used, for example, for designating the optical fibers used in the system as "outgoing" or "incoming".

Signals external to the system may be transmitted and received as radio signals 13 as in a cellular network or may be transmitted and received via a fiber optic cable 14 or copper wires 15. The hub also includes an RF interface unit 16 which converts a received signal into an outgoing RF electrical signal at 17 and converts an incoming RF signal at 18 into a transmitted signal for transmission outside the system. The outgoing RF signal is applied to one or more fiber optic transceivers 21 which convert the RF electrical signal to an optical signal. The outgoing RF signal passes through an RF splitter 19 for application to several fiber optic transceivers. Similarly, multiple incoming RF signals from several transceivers are summed in an RF combiner 20.

In the case of signals entirely within the system, i.e. from one antenna station to another antenna station or between two devices within a sector, incoming optical signals are converted to electrical signals via fiber optic transceivers, processed by the RF interface unit, routed by an local area network server or the like (not shown) and returned as outgoing signals to appropriate fiber optic transceivers.

Each fiber optic transceiver serves a sector of the building. Such a sector may be a floor of the building, a suite of offices, a department or the like. Each sector is served by an antenna station 22. A fiber optic cable 23 connects each of the antenna stations with one of the fiber optic transceivers. Each of the fiber optic cables comprises an outgoing optical fiber for conveying an optical signal from the transceiver to the antenna station and an incoming optical fiber for conveying an incoming signal from the antenna station to the receiver. Typically, the cable also includes a DC power supply circuit for operating the antenna station, or the antenna stations may be locally powered.

In some cases it may be more economical to use a combination of fiber optic and coaxial cables for serving a sector. In such a situation one may add antennas 38 to a sector's antenna station 22 by connecting the antennas to a coaxial cable 24 by RF couplers 25.

The antenna stations are connected to the RF signal distribution hub by fiber optic cables arranged in a star configuration. A conventional network may have the stations connected in a loop or "daisy chain" where each station is connected in turn to the next station around the loop. Another common network configuration is tree and branch as is used for cable television signals, for example, where a signal from a central station goes to a remote location where it is split into branches for a number of users.

The fiber optic system provided in practice of this invention has a star configuration or hub and spoke. By having each antenna station 22 connected directly to the RF signal distribution hub, it becomes quite easy to install additional antenna stations. For example, a connection need be made only at the antenna station and at the hub. There is a reliability benefit in that if a connector cable or laser is defective, only one antenna station is degraded and the balance of the network is still operable. In the event individual antenna stations become defective, they can be easily identified and replaced.

A star configuration for a fiber optic local area system has several advantages in addition to robustness and reliability. Such a star configuration system is easily installed since identical cabling and connectors can be used between the hub and the distributed RF antenna stations. Furthermore, the optical fiber connections in a star configuration can be simple and all connections can be identical. The attenuation of optical fibers is negligible throughout a building or campus of buildings so that no specific site engineering is required to assure that a system operates properly for a given installation. Such a system is easily expanded or modified. Such a system has low power consumption.

FIG. 3 illustrates schematically an exemplary fiber optic transceiver 21. An outgoing RF signal is applied to an amplifier 26 and semiconductor laser diode 27. The laser is adjacent to the end of an outgoing optical fiber 28 in a conventional angled physical contact (APC) connector 29. An "outgoing" optical fiber carries a signal from the RF signal distribution hub to an antenna station.

An incoming signal arrives at the fiber optic transceiver from an antenna station by way of an incoming optical fiber 31 with a separate connector 32 to the transceiver. A photodiode 33 is adjacent to the end of the incoming optical fiber and is connected to an amplifier 34 which provides an incoming electrical signal to the RF transceivers.

The other end of the outgoing optical fiber 28 has a connector 36 which plugs into an antenna station 22 as illustrated in FIG. 4. An outgoing photodiode 37 is adjacent to the end of the outgoing optical fiber. The photodiode signal is amplified and applied by way of a coupler 40 to an RF antenna 38 from which the signal radiates to cellular devices within range of the antenna.

An incoming RF signal from a cellular device is picked up by the RF antenna, amplified and applied for modulating a semiconductor laser diode 39. The laser diode is adjacent to an angled physical contact (APC) connector 41 for an incoming optical fiber 31 which transmits the incoming optical signal to the fiber optic transceiver.

An important feature for making a low cost reliable fiber optic RF signal distribution system comprises the laser and optical fiber connection. At least one end, and preferably both ends, of each optical fiber in the star configuration includes a conventional APC connector. A typical APC connector has a metal body surrounding a cylindrical ceramic plug through which the end of the optical fiber passes. A threaded nut on the APC connector removably fastens it to a connector housing. The details of the APC connector are not illustrated herein since they are conventional and well known in the art. The ceramic plug of such a connector is illustrated schematically in FIG. 6.

In an APC connector, the end of the optical fiber is flush with the outermost end of the ceramic plug. In conventional use of an APC connector, good optical coupling is provided between the end of the optical fiber and an adjacent similar fiber by physical contact between the ends of the ceramic plugs and hence the ends of the optical fibers. By avoiding an air gap between the fibers, there is good optical coupling. To assure that there is good physical contact between the ends of the optical fibers, the ends of the ceramic plugs are made with a very slight curvature instead of being plane. The curvature has a very large radius so that the end of the fiber is nearly flat. Furthermore, the center of curvature is offset from the axis of the fiber so that there is an acute angle (about 8°) between the axis of the fiber and a radius to the center of curvature. All such connectors have a similar angle so that the contact between the ends of the optical fibers is angled relative to the fibers. This type of construction is the origin of the designation APC, "angled physical contact" connector.

An APC connector is one example of a connector useful in this invention. As will become apparent, other connectors with an angled end on the fiber may also be used. "Angled end" means an end plane which is not normal to the axis of the fiber.

Low cost in the fiber optic RF signal distribution system is achieved by employing a connector housing containing a laser and optical system for direct optical coupling between the laser and a connector with an angled end on the optical fiber that is plugged into the connector housing. Such a housing is illustrated in perspective in FIG. 5.

A typical connector housing for an APC connector has a metal body 41 with laterally extending flanges 42 for bolting the housing to the chassis of the RF signal distribution hub or an antenna station. The outer end of the body is threaded for receiving the nut on a standard APC connector. A slot 43 in the threaded end forms a key way for receiving a raised key on the body of an APC connector for correctly aligning the angled ceramic plug in the connector. A tight fitting split sleeve 44 in the body assures concentricity of the ceramic plug of the connector with the optical system in the connector housing. Such an arrangement for receiving a standard APC connector is conventional.

The connector housing may have a significantly different exterior. For example, instead of flanges for bolting to a housing, the connector half may have male threads for receiving a nut for fastening to a housing in the same manner as conventional panel mounting connector halves.

Figure 7:
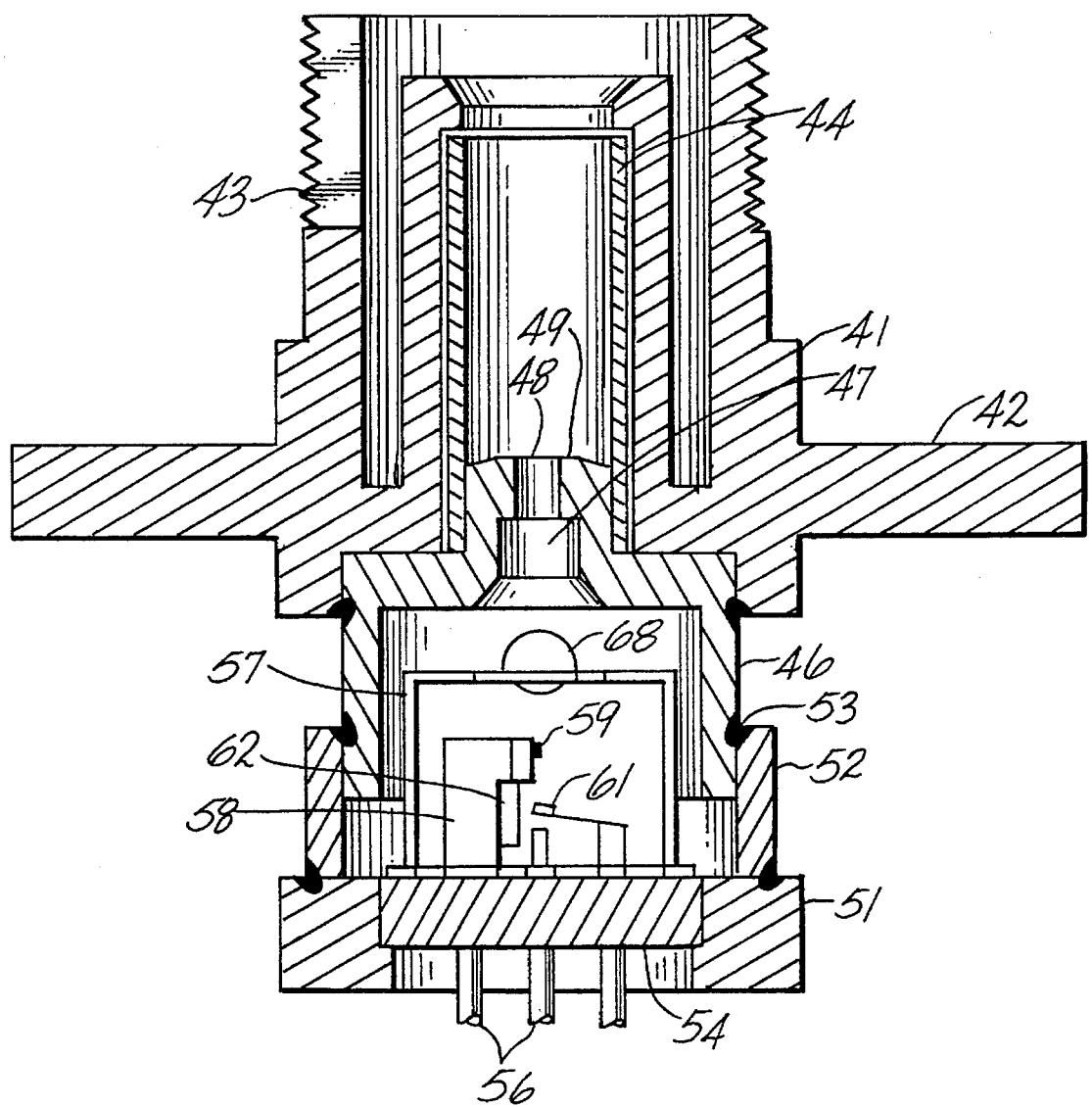
FIG. 7 is a longitudinal cross section through such a connector housing.

As illustrated in FIG. 7, in the connector housing provided in practice of this invention, there is a hollow insert 46 inserted into the body and laser welded to the body. The insert has a passage from its hollow interior to an end referred to herein as an aperture plane 48. A stop surface 49 is immediately adjacent to the perimeter of the passage at the aperture plane. The stop surface engages the end of the ceramic plug (not shown in FIG. 7) of a standard APC connector when it is inserted into the housing. The stop surface assures that the end of the optical fiber in the plug is located very close to the aperture plane. The split sleeve 44 engages an external surface on the insert 46 as well as the ceramic plug to keep the plug concentric with the insert.

A base 51 includes an upstanding sleeve 52 which fits over the outside of the body insert and is secured thereto by a plurality of spot welds or circumferential laser weld 53. As explained hereinafter, this fit between the sleeve and insert are used for adjustment during assembly of the connector housing.

A header 54 is secured in the base 51, typically by press fitting. Four metal pins 56 extend through glass seals in the header for making electrical connections to components inside the connector housing.

A lid 57 is hermetically sealed on the header to form a laser subassembly. A rigid post 58 within the laser subassembly supports a semiconductor laser 59. In the embodiment illustrated in FIG. 7, a photodiode 61 is cantilevered from another post and is directly behind the laser. Other electrical components are formed on a substrate 62 on the rigid post.

Figure 6:
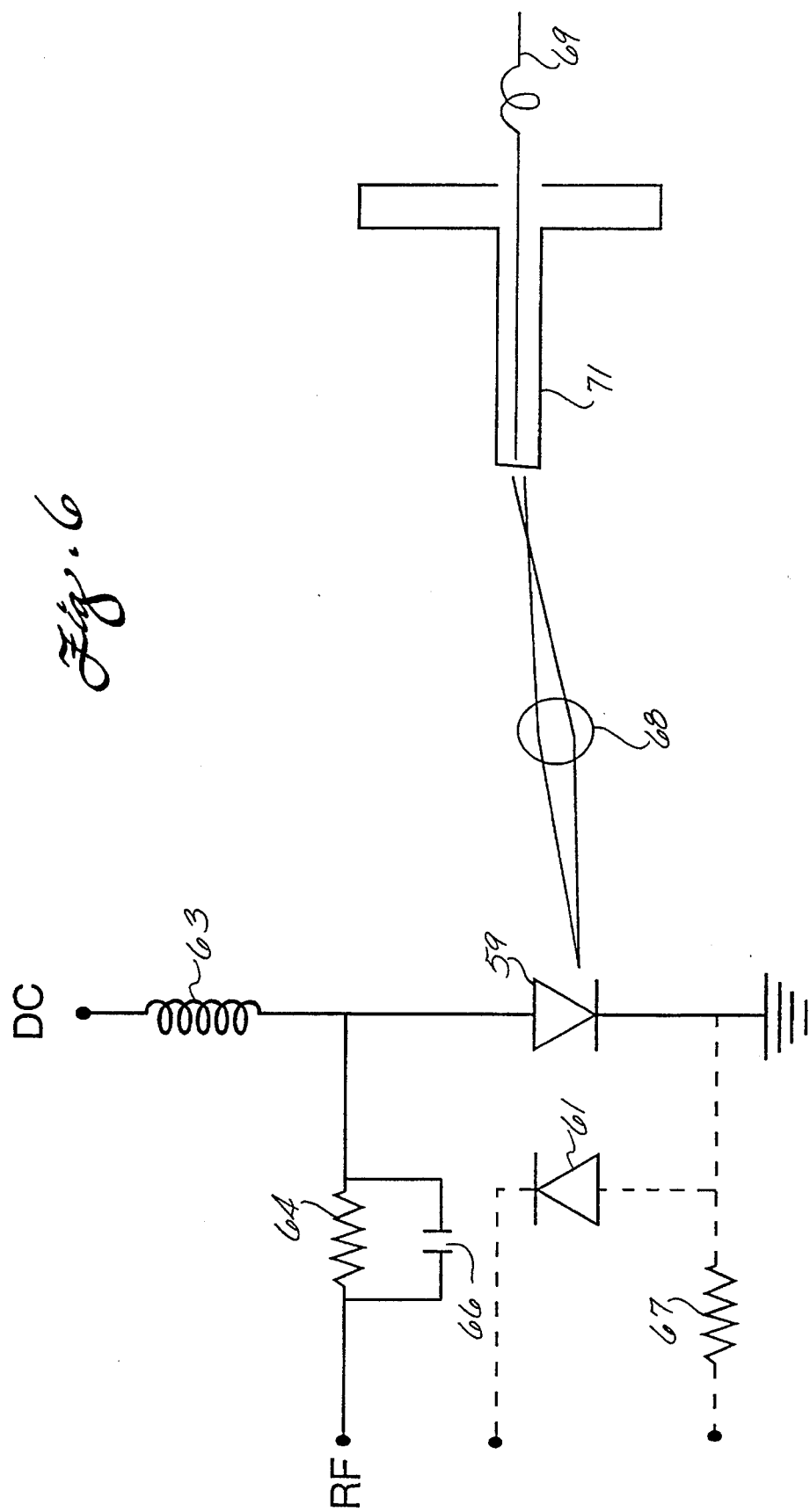
FIG. 6 is a schematic diagram of such an electrical to optical connector housing.

Typical electrical connections are illustrated schematically in FIG. 6. The laser is connected to a DC bias by an inductor 63 and is also connected to ground. An RF modulating signal is also connected to the laser by a resistor 64 and capacitor 66. The inductor, capacitor and resistor tend to isolate the RF signal and the DC bias from each other. The DC bias, RF modulating signal and electrical ground use three of the four pins through the header.

The fourth pin may be used for either a photodiode 61 as illustrated in FIG. 7 or a thermistor 67 (FIG. 6). Either of these additional components may be used as desired for a particular application. When a photodiode is used, a portion of light through the back face of the laser illuminates the photodiode. The photodiode output may be used in an external feedback circuit for adjusting the DC bias current for controlling laser performance. Alternatively, a thermistor which is mounted on the bottom of the laser subassembly monitors the temperature of the connector housing. The thermistor signal may be used in an external feedback for controlling temperature or adjusting the DC bias for compensating changes in laser performance as a function of temperature.

The front of the electrical to optical converter module has at least a center portion that is transparent and includes a lens 68. The lens and laser are aligned for appropriately illuminating the aperture plane with light from the laser. The correct positions of the laser and lens are determined during assembly of the laser subassembly. The sequence of assembly of the laser module into the connector housing fixes the least critical positions first and the more critical positions last.

The laser module is assembled first. A laser 59 is mounted on the post 58 in its correct position off of the axis of the header 54. The cover 57 is then hermetically sealed onto the header with the lens coaxial with the header. The header is then pressed into the base 51. A subassembly of insert 46, sleeve 52 and base with laser module is then loosely assembled. The insert and sleeve are welded together at the appropriate telescoped spacing for placing the focus of the light from the laser near, but not in, the aperture plane for the desired illumination of the aperture plane. Finally, the base is positioned so that the lens is in an appropriate position off the axis of the insert and the base is welded to the sleeve.

This insert assembly is then inserted into the body of the connector housing and spot welded in place. This position is not critical since the optical fiber is positioned relative to the insert 46 by the stop surface 49 and split sleeve 44. The angular orientation of the insert subassembly and the body 41 also has a loose tolerance and the position of the pins 56 relative to the slot 43 is adequate for alignment.

Although this sequence of aligning and welding the parts together is preferred, a different sequence could be used. Parts of the connector can be assembled with epoxy bonding or the like instead of welding.

As can be seen by the schematic illustration of FIG. 6, the laser 59 and lens 68 are not aligned with the axis of an optical fiber 69 extending through the ceramic plug 71 of a standard APC connector (indicated schematically). Instead, the laser and lens are offset at an angle that assures that light enters the end of the fiber in an axial direction after refraction at the angled end. It is for this reason that the laser, lens and interconnecting structures are carefully oriented relative to the key way of the connector housing which positions the connector and hence ceramic plug in its correct orientation.

The semiconductor laser used for the low cost RF signal distribution system is preferably a distributed feedback (DFB) laser. DFB lasers are conventional semiconductor devices. Many semiconductor lasers use cleaved output and back facets to obtain the feedback necessary for lasing. Feedback can also be obtained by periodic variations within the lasing cavity. Typically, this is produced by corrugating the interface between two adjacent cladding layers. The periodic ridges and grooves of the corrugated portion form a diffraction grating so that constructive interference due to the grating provides feedback distributed along at least a portion of the cavity length. As a result, the DFB laser has a single longitudinal mode output. The single output frequency (actually a narrow band of frequencies) is determined by the periodicity of the grating.

A DFB laser is preferred in the low cost transceiver system since it has the lowest noise of semiconductor lasers. A DFB laser, however, is more sensitive to external reflections than a Fabry-Perot laser. The optical system in the connector housing is therefore designed to minimize reflections. This design includes non-axial alignment of the laser and lens and "loose coupling" of the light from the laser to the optical fiber.

An angled end on the optical fiber such as provided in an APC connector is employed with the DFB laser so that illumination from the laser is not normal to the end of the ceramic plug and fiber. Thus, specular reflections from the end of the plug and fiber cannot reenter the laser.

The spacings of the laser, lens and aperture plane are fixed during assembly of the connector housing so that light from the laser is deliberately not focused on the aperture plane. The alignment is set so that about three to five percent of the light from the laser actually enters the core of the fiber. This is a result of two effects. One is that with the defocusing of the illumination at the aperture plane, the wave fronts encountering the end of the fiber are somewhat spherical instead of flat. Only the "flat" component of the spherical wavefront successfully traverses the fiber. Secondly, the area of the ceramic plug illuminated is larger than the area of the end of the fiber core and only light that illuminates the end of the fiber core can enter it.

Another way of loosely coupling light from the laser into the fiber would be to have the light from the laser illuminate the angled end of the optical fiber at an angle that is not optimum for refraction into the fiber in the axial direction. Flooding the end of the fiber with light that is not focused at the aperture plane, but which is at the correct angle for refraction into the fiber, is preferable since the proportion of light coupled into the fiber remains substantially unchanged if the fiber is displaced laterally within the illuminated area. Thus, manufacturing and positioning tolerances are significantly relaxed as compared with a device where the laser light is focused on the core of the fiber.

Since only about three to five percent of the light from the DFB laser enters the optical fiber, any reflections or backscattering from the fiber which could reenter the laser have extremely low power levels relative to the power level of the laser. Such loose coupling of the illumination thereby avoids reflections from the fiber that would destabilize the DFB laser.

As an alternative to loose coupling of the laser output and the optical fiber input, one may employ an optical isolator and couple a higher proportion of the laser light into the fiber. Very small dimension and low cost optical isolators are becoming available. Such an optical isolator can be placed in a passage 47 in the insert 46 between the lens and aperture plane of the connector.

Figure 8:
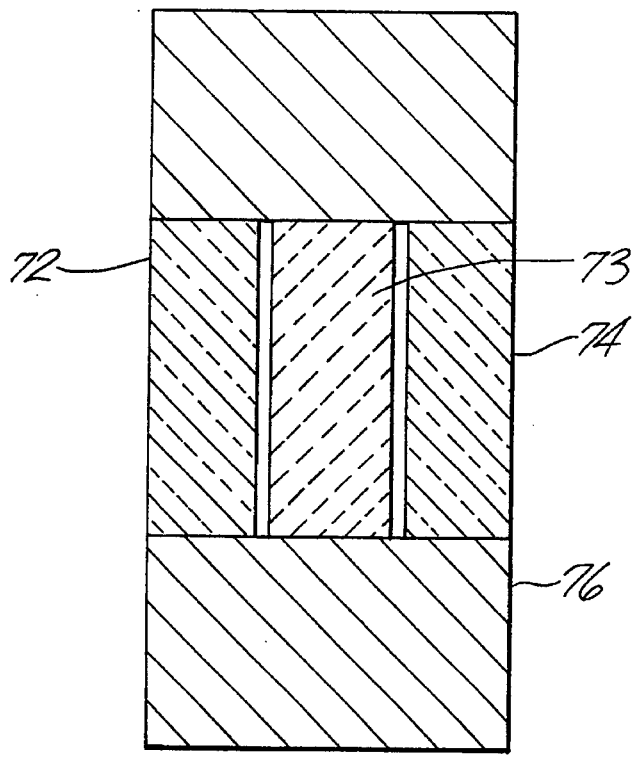
FIG. 8 is a transverse cross section through an optical isolator for use in the housing of FIG. 7.

Such an optical isolator is illustrated in FIG. 8 and comprises a sandwich of a plane polarizer 72, polarization rotator 73 and another polarizer 74, positioned within a rare earth magnet 76. Each polarizer comprises a thin sheet of glass including a surface layer containing silver dipoles tuned to the wavelength of the light from the laser and stretch oriented for high quality polarization of the light beam. Such a polarizing material is available from Corning as Polacor. The rotator is a garnet type crystal sandwiched between the polarizers. The polarizers are set at 45° with respect to each other in the optical isolator. Other polarizers may also be used.

A light beam from the laser is plane polarized by the first polarizer. The rotator then rotates the plane of polarization 45° so that it is aligned with the second polarizer and readily passes therethrough. Any light reflected back toward the optical isolator passes through the first polarizer and is again rotated 45° by the rotator. This places the plane of polarization of the reflected light 90° from the polarization of the original light beam. When this rotated reflected light beam encounters the second polarizer, its passage is prevented.

It is important to use an angled end on the optical fiber, such as in an APC connector, for the connectorized laser module. When two APC connector halves are connected together, there is essentially no air gap between the ends of the fibers and there is good optical coupling. In addition, there is very low reflection from the fiber connection. When there is an "open" connector where a fiber end has a glass-air interface, reflected light will be coupled back into the fiber if the fiber has an end that is normal to the axis of the fiber. In this case, light that is backscattered from within the fiber or reflected from the far end will be reflected from the near end and interfere with forward travelling light. That is avoided with an angled end on the fiber. The end of a fiber in the connector described herein has a glass-air interface and reflections within the fiber are inhibited by using an angled end face.

It is also desirable to employ an angled end face such as provided by an APC connector half at the output end of an optical fiber. In a low cost system it is also desirable to avoid having both halves of a connector in use at the output end of the fiber. Instead, one may use a fiber-air interface of an APC connector in combination with a connectorized photodiode. Such an arrangement is illustrated schematically in FIG. 9. Structurally the connector arrangement is similar to what has already been illustrated in FIGS. 5 and 7 and the details are omitted from FIG. 9.

At this output end of the fiber optic cable an optical fiber 169 extends through the ceramic plug 171 of a standard APC connector 81 indicated only as a dashed outline in the drawing. The APC connector is mated with a connectorized photodiode, the housing 82 of which is also indicated schematically in FIG. 9. This connector housing includes a lens 168 positioned close enough to an aperture plane 83 of the housing that light from the optical fiber encounters the lens despite being refracted at an angle from the axis of the fiber because of the angled end on the fiber. Preferably the lens is large enough or positioned close enough to the end of the fiber that the light is incident on a central portion of the lens where optical aberrations are minimized. The lens refocuses the light from the fiber toward the optical axis of the connector.

A photodiode 84 is located on the optical axis in or near the focal plane of the lens. Light from the fiber refracted by the lens is therefore directed onto the photodiode. Precise focusing on the photodiode or exact positioning on the optical axis are not critical. All that is required is that a maximum amount of the light from the fiber actually illuminates the photodiode.

This lack of criticality can be appreciated by recognizing that a connectorized photodiode may be employed without a focusing lens between the end of the fiber and the photodiode. All that would be needed is that the photodiode have a large enough area to receive most or all of the light from the fiber even though the light is off axis. It is preferred, however, to employ a lens instead of a large area photodiode since the capacitance of the photodiode increases with increasing area and such capacitance can limit the high frequency response of the photodiode.

Figure 9:
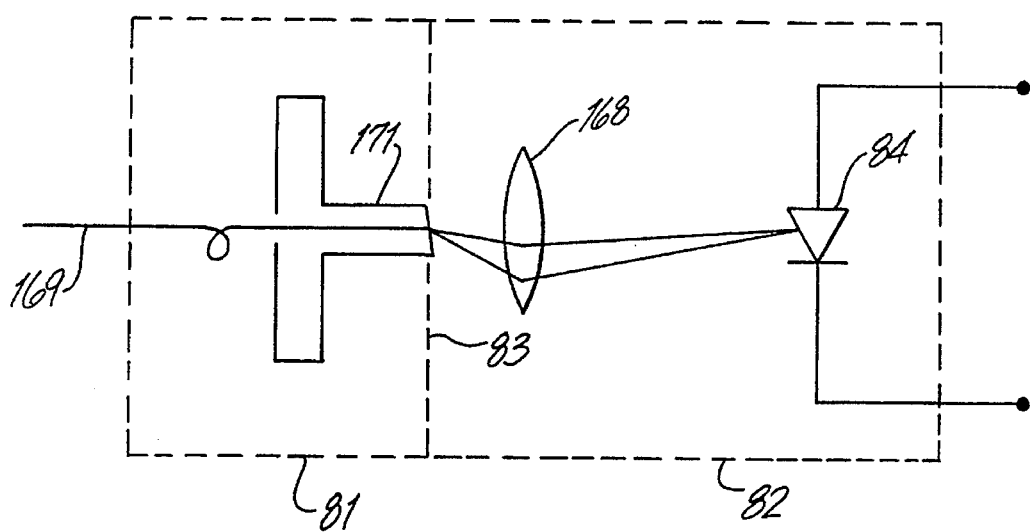
FIG. 9 is a schematic diagram of a photodiode in a connector housing.

It will be noticed that in a connector arrangement as illustrated in FIG. 9 it is not necessary to angularly orient the APC connector relative to the housing of the connectorized photodiode. A large enough lens can readily be provided on axis for illumination by the light from the fiber regardless of its angular orientation.

As an alternative arrangement, one may provide for angular orientation between the APC connector and the housing of the connectorized photodiode. In such an embodiment a small area photodiode may be placed off axis at a location where it will be illuminated by light from the fiber. Such an off axis photodiode can be a relatively small size for adequate high frequency response.

Thus, a suitable low cost fiber optic signal transmission system may comprise a connectorized laser module as illustrated in FIGS. 5 to 7, an optical fiber having an angled end at each end such as by having an APC connector at each end, and a connectorized photodiode as illustrated in FIG. 9. Thus, each end of the optical fiber has a fiber-air interface, but since both ends are angled relative to the axis of the fiber, reflections do not pose any problems. Such an arrangement is desirable for a number of reasons. Such a fiber optic cable is not "handed". In other words, either end of the cable can be the input or the output. Surplus connector halves can be avoided by reason of the connectorized laser module and connectorized photodiode. The system is low cost since low cost components are used. Installation is easy and does not require highly skilled labor.

Although described for particular utility in an RF signal distribution system, it will be apparent that a connector housing with built-in DFB laser is useful in a number of other applications where a modulated semiconductor laser illuminates an optical fiber. Previously, low reflection laser modules have been constructed which have an optical fiber output. This optical fiber is connected to another optical fiber for long transmission distances by means of an APC connector or the like. Regardless of the excellent transmission characteristics of APC connectors, there is the cost of a pair of such connectors. In effect, applicants have provided a laser module with an output for direct coupling to an optical fiber connector instead of an optical fiber output. This permits connecting the optical fiber directly to the module instead of requiring an additional connector half.

Although described as an RF signal distribution system for communications outside of a system, it will be apparent that a cellular telephone system is merely exemplary of the applications. Such an optical fiber wireless signal distribution system may be used in mobile radio systems for vehicles moving around a warehouse, for example. Because of the broad bandwidth available in a short range system of this sort, it is ideally suited for mobile personal communications. Such a system may also be used as a broadband wireless local area network with or without communication outside of the local area network. Such a system may simply be used as a wireless PBX which permits communication with anyone within range, regardless of their location. Other wireless digital terminal equipment systems will be apparent.

Although the connectors for a fiber optic data transmission system have been described as standard APC connectors, it will be apparent that these are merely exemplary of connectors that may have an angled end on the optical fiber. Thus, in a standard APC connector the end of the fiber is not only angled relative to the axis of the fiber, the ceramic plug and fiber end have a slight curvature so that the ends of adjacent fibers are sure to be in physical contact. Such curvature is not important in practice of this invention since the ends of the fiber have a fiber-air interface instead of a fiber-fiber interface. A connector with a simple flat diagonal end is equivalent for practice of this invention. A standard APC connector with curvature may, however, be useful so that cables may be standardized and used with conventional connectors as well.

For such reasons, it will be apparent that many modifications and variations may be made and that this invention may be practiced otherwise than as specifically described.

What is claimed is:

1. A fiber optic RF signal distribution system comprising:
   a plurality of distributed antenna stations, each antenna station including an RF antenna and means for converting between optical and electrical signals;
   an RF signal distribution hub for receiving and transmitting signals;
   a pair of optical fibers connecting each antenna station directly to the distribution hub for transmitting signals therebetween, the optical fibers between the signal distribution hub and the antenna stations being connected in a star configuration; and means for coupling a semiconductor laser directly to a connector on the end of each optical fiber without an intervening connector.

2. A fiber optic RF signal distribution system as recited in claim 1 wherein the means for coupling a laser comprises:

a fiber connector having an angled end on the optical fiber;

a connector housing for receiving the fiber connector;

means for positioning the angled end of the optical fiber in the fiber connector in an aperture plane in the housing;

a laser mounted in the connector housing; and means for directing illumination from the laser onto the aperture plane at an acute angle to the axis of the optical fiber.

3. A fiber optic RF signal distribution system as recited in claim 2 wherein the laser comprises a distributed feedback laser.

4. A fiber optic RF signal distribution system as recited in claim 3 comprising an optical system aligned so that the laser is not focused on the aperture plane.

5. A fiber optic RF signal distribution system comprising:

a plurality of distributed antenna stations, each antenna station including an RF antenna and means for converting between optical and electrical signals;

an RF signal distribution hub for receiving and transmitting signals;

a pair of optical fibers connecting each antenna station directly to the distribution hub for transmitting signals therebetween, the optical fibers between the signal distribution hub and the antenna stations being connected in a star configuration; and a fiber optic connector housing at the distribution hub for connection to one of the optical fibers for an antenna station, the connector housing comprising:

a plurality of electrical input pins, a semiconductor laser mounted in the housing and connected to the input pins, and a socket for receiving an optical fiber connector with the end of an optical fiber in the connector being angled relative to the axis of the fiber and optically aligned with the laser.

6. A fiber optic RF signal distribution system as recited in claim 5 wherein the laser comprises a distributed feedback laser.

7. A fiber optic RF signal distribution system as recited in claim 6 wherein the connector housing further comprises a lens between the laser and an aperture plane positioned for receiving the end of the optical fiber in a fiber connector, the optical axis of the lens and laser being at an acute angle to the axis of the housing and aligned for illuminating an area of the aperture plane larger than the area of the end of an optical fiber.

8. A fiber optic RF signal distribution system comprising:

a plurality of distributed antenna stations, each antenna station including an RF antenna and means for converting between optical and electrical signals;

an RF signal distribution hub for receiving and transmitting signals;

a pair of optical fibers connecting each antenna station directly to the distribution hub for transmitting signals therebetween, the optical fibers between the signal distribution hub and the antenna stations being connected in a star configuration; and a connector housing including a semiconductor laser and a lens between the laser and an aperture plane positioned for receiving the end of the optical fiber of an APC connector, the optical axis of the lens and laser being at an acute angle to the axis of the housing and aligned for illuminating an area of the aperture plane larger than the area of the end of an optical fiber.

9. A fiber optic RF signal distribution system comprising:

a plurality of distributed antenna stations, each antenna station comprises a plurality of RF antennas and means for converting between optical and electrical signals;

an RF signal distribution hub for receiving and transmitting signals; and a pair of optical fibers connecting each antenna station directly to the distribution hub for transmitting signals therebetween, the optical fibers between the signal distribution hub and the antenna stations being connected in a star configuration; and wherein at least a portion of the antennas are connected to the antenna station by coaxial cable.

10. A fiber optic RF signal distribution system comprising:

a plurality of antenna stations, each antenna station including an RF antenna;

an RF signal distribution hub for receiving and transmitting signals within the system;

a pair of optical fibers connecting each antenna station directly to the distribution hub;

means at an end of each optical fiber for removably placing the end of the optical fiber in an aperture plane; and a semiconductor laser illuminating the aperture plane.

11. A fiber optic RF signal distribution system as recited in claim 10 wherein the means for placing the end of an optical fiber in an aperture plane comprises an APC connector, and further comprising a lens between the laser and aperture plane for illuminating the aperture plane at an acute angle to the axis of the optical fiber.

12. A fiber optic RF signal distribution system as recited in claim 11 wherein the laser comprises a distributed feedback laser and wherein the laser and lens are mounted so that light from the laser is not focused at the aperture plane.

13. A fiber optic RF signal distribution system as recited in claim 10 wherein the optical fibers between the distribution hub and the antenna stations are connected in a star configuration.

14. A fiber optic RF signal distribution system comprising:

an RF signal distribution hub for receiving and transmitting signals external to system;

a plurality of electrical to optical converters connected to the distribution hub for converting each received electrical signal to an outgoing optical signal;

a plurality of optical to electrical converters connected to the distribution hub for converting an incoming optical signal to a transmitted electrical signal;

a plurality of antenna stations, each antenna station comprising:

an RF antenna, a photodetector for sensing an outgoing optical signal, means for connecting the photodetector to the antenna for broadcasting an outgoing RF signal, a distributed feedback laser, and means for connecting the antenna to the laser for converting an incoming RF signal to an incoming optical signal;
an outgoing optical fiber connecting each electrical to optical converter to the photodetector of one of the antenna stations;
means for minimizing reflections from the optical fiber back into the laser; and
an incoming optical fiber connecting the laser of one of the antenna stations to each optical to electrical converter; and wherein the optical fibers are connected in a star configuration.

15. A fiber optic RF signal distribution system as recited in claim 14 wherein the means for minimizing reflections comprises means for defocusing the laser at the end of an optical fiber and means for aligning the laser at an acute angle to the axis of the optical fiber.

16. A fiber optic RF signal distribution system comprising:
an RF signal distribution hub for receiving and transmitting signals external to the system;
a plurality of electrical to optical converters connected to the distribution hub for converting each received electrical signal to an outgoing optical signal;
a plurality of optical to electrical converters connected to the distribution hub for converting an incoming optical signal to a transmitted electrical signal;
a plurality of antenna stations, each antenna station comprising:
 a plurality of RF antennas, at least a portion of the antennas being connected to the antenna station by coaxial cable;
 a photodetector for sensing an outgoing optical signal, means for connecting the photodetector to the antenna for broadcasting an outgoing RF signal, a laser, and means for connecting the antenna to the laser for converting an incoming RF signal to an incoming optical signal;
an outgoing optical fiber connecting each electrical to optical converter to the photodetector of one of the antenna stations; and
an incoming optical fiber connecting the laser of one of the antenna stations to each optical to electrical converter; and wherein the optical fibers are connected in a star configuration.

17. A fiber optic RF signal distribution system comprising:
a plurality of distributed antenna stations, each antenna station including an RF antenna and means for converting between optical and electrical signals;
an RF signal distribution hub for receiving and transmitting optical signals within the system; and
a pair of optical fibers connecting each antenna station directly to the distribution hub for transmitting signals therebetween, each optical fiber comprising a connector having an angled end on the optical fiber at each end;
a semiconductor laser adjacent to such a connector at one end of each optical fiber and optically coupled to the end of the fiber via an air-fiber interface; and
a photodiode adjacent a connector having an angled end on the optical fiber at the opposite end of each optical fiber and optically coupled to the end of the fiber via a fiber-air interface.

18. A fiber optic RF signal distribution system comprising:
a plurality of antenna stations, each antenna station including an RF antenna;
an RF signal distribution hub for receiving and transmitting signals within the system;
a pair of optical fibers connecting each antenna station directly to the distribution hub;
means at an end of each optical fiber for removably placing the end of the optical fiber in an aperture plane; and
a semiconductor laser illuminating the aperture plane.

19. A fiber optic RF signal distribution system as recited in claim 18 further comprising:
means at the opposite end of each optical fiber for removably placing the end of the optical fiber in an aperture plane; and
a photodetector optically placed for illumination by light from the end of the optical fiber in the aperture plane.

* * * * *